(12) United States Patent
Ungerboeck (10) Patent No.: US 7,356,087 B2
(45) Date of Patent: Apr. 8, 2008

(54) BIT MAPPING FOR VARIABLE-SIZE HIGHER-ORDER DIGITAL MODULATIONS

(75) Inventor: Gottfried Ungerboeck, Langnau (CH)

(73) Assignee: Broadcom Corporation, Irvine, CA (US)

( * ) Notice: Subject to any disclaimer, the term of this patent is extended or adjusted under 35 U.S.C. 154(b) by 776 days.

(21) Appl. No.: 10/765,665

(22) Filed: Jan. 27, 2004

(65) Prior Publication Data

US 2005/0163242 A1    Jul. 28, 2005

(51) Int. Cl.
*H04L 5/12* (2006.01)
(52) U.S. Cl. .................. 375/261; 375/267; 375/265; 375/298; 714/810; 714/792
(58) Field of Classification Search ............... 375/261, 375/295, 267, 347, 259, 298, 265; 714/800, 714/810, 792
See application file for complete search history.

(56) References Cited

U.S. PATENT DOCUMENTS 5,150,381 A * 9/1992 Forney et al. ............... 375/261

* cited by examiner

*Primary Examiner*—David C. Payne
*Assistant Examiner*—Rahel Guarino
(74) *Attorney, Agent, or Firm*—Garlick Harrison & Markison, LLP; Bruce E. Garlick (57) ABSTRACT

Mapping of m input bits to $2^m$ modulation symbols of a two-dimensional symbol constellation. A quarter-quadrant constellation of $2^{m-4}$ modulation symbols that are located in a first quadrant of the two-dimensional signal plane is formed with each modulation symbol associated with a respective m-4 bit label. A quarter constellation of the two-dimensional symbol constellation is formed by adding to the quarter-quadrant constellation three copies of the quarter-quadrant constellation rotated by −90 degrees, 180 degrees, and −270 degrees, respectively, and then displacing the quarter constellation by a shift value Δ, with each modulation symbol associated with a respective m-2 bit label. The two-dimensional symbol constellation is then formed by adding to the quarter constellation three copies of the quarter constellation rotated by +90 degrees, 180 degrees, and +270 degrees, respectively. Each symbol of the two dimensional constellation is associated with a respective m bit label of the m input bits.

26 Claims, 12 Drawing Sheets

FIG. 5C Shifted Quarter Constellation

FIG. 5B Quarter Constellation

FIG. 5A Quarter-quadrant (qq) constellation $a_{qq}(y_{s+1}^{m-1}, y_3^{s-1}) \in \{2,6,10,\ldots\} + j\{2,6,10,\ldots\}$

1024QAM Full constellation

FIG. 9A

1024QAM Quarter-quadrant constellation

1024-QAM label ($y^9y^8y^7y^6y^5y^4y^3y^2y^1y^0$)

BIT MAPPING FOR VARIABLE-SIZE HIGHER-ORDER DIGITAL MODULATIONS

BACKGROUND OF THE INVENTION

1. Technical Field of the Invention

This invention relates generally to digital communications; and more particularly to higher order modulations used in high-speed digital communication systems.

2. Description of Related Art

In digital communication systems, more than one digital modulation scheme may be employed for the transfer of digital information. Digital modulations are generally susceptible to noise and other signal impairments introduced by the communication channel. In order to cope with different channel conditions, some high-speed digital communication systems use a multitude of digital modulations, e.g., QPSK, 8-QAM, 16-QAM, 32-QAM, 64-QAM, 128-QAM, etc., and different levels of coding and transmit power. While one channel may support a lower order modulation, e.g., QPSK, permitting only a lower data rate, another channel may support a higher order modulation, e.g., 64-QAM, providing higher data rate. Commonly used coding schemes include forward error correction (FEC) coding such as Reed-Solomon coding and inner channel coding such as convolutional coding, trellis coded modulation, or Turbo Coding, etc. Between FEC coding and inner coding the order of data is usually permuted by an interleaver.

Multiple digital modulations are employed in a variety of digital communication systems, e.g., in voiceband modems, digital subscriber links (DSLs), cable modem systems, and a wide variety of wireless systems. The particular manner in which higher order constellations are constructed and the way in which coding is employed and bits are mapped into modulation symbols represents an important topic in designing communication systems.

Sometimes there exists a need to augment existing standards for communication systems with additional capabilities. For example, in the particular case of downstream transmission in cable modem systems one may want to add to existing 64 QAM and 256 QAM modes, for example.

SUMMARY OF THE INVENTION

A method according to the present invention maps m input bits to $2^m$ modulation symbols of a two-dimensional symbol constellation. For typically $m \geq 6$, the method consists in forming first a constellation of $2^{m-4}$ modulation symbols suitably arranged in the first quadrant of the two-dimensional signal plane. This constellation is called a quarter-quadrant constellation and has one-sixteenth the size of the desired two-dimensional symbol constellation. Each quarter-quadrant constellation symbol is uniquely associated with a respective m-4 bit label of the m input bits.

A quarter constellation of the two-dimensional symbol constellation is then formed by adding to the quarter-quadrant constellation three copies of the quarter-quadrant constellation rotated by −90 degrees, 180 degrees, and −270 degrees, respectively, and then displacing the quarter constellation by a shift value Δ. Displacing the quarter constellation by the shift value Δ causes the symbols to coincide with symbols of the desired two-dimensional symbol constellation. The quarter constellation has one-fourth the size of the two-dimensional symbol constellation. Each symbol of the quarter constellation is then associated with a respective m-2 bit label of the m input bits, wherein m-4 bits of the m-2 bit label are inherited from the quarter-quadrant constellation and two further bits of the m-2 bit label are used to distinguish quarter-quadrants of the quarter constellation.

The two-dimensional symbol constellation is then formed by adding to the quarter constellation three copies of the quarter constellation rotated by +90 degrees, 180 degrees, and +270 degrees, respectively. Each symbol of the two-dimensional symbol constellation is then associated with an m-bit label, wherein m-2 bits of the m-bit label are inherited from the quarter constellation and two further bits of the m input bits are used to distinguish quarters of the two-dimensional symbol constellation.

The mapping method of the embodiment supports various constellation sizes including 64 QAM, 128 QAM, 256-QAM, 512 QAM, and 1024 QAM. The technique may be extended in to other constellations as well. The 64 QAM, 256 QAM, and 1024 QAM constellations are formed as square constellations from quarter quadrant constellation, which are square constellations in the first quadrant. The 128 QAM and 512 QAM constellations are obtained from initially rectangular quarter quadrant constellations in the first quadrant, of which a plurality of symbols are repositioned such that the 128 QAM and 512 QAM constellations become cross constellations.

Other features and advantages of the present invention will become apparent from the following detailed description of the invention made with reference to the accompanying drawings.

DETAILED DESCRIPTION OF THE DRAWINGS

Figure 1:
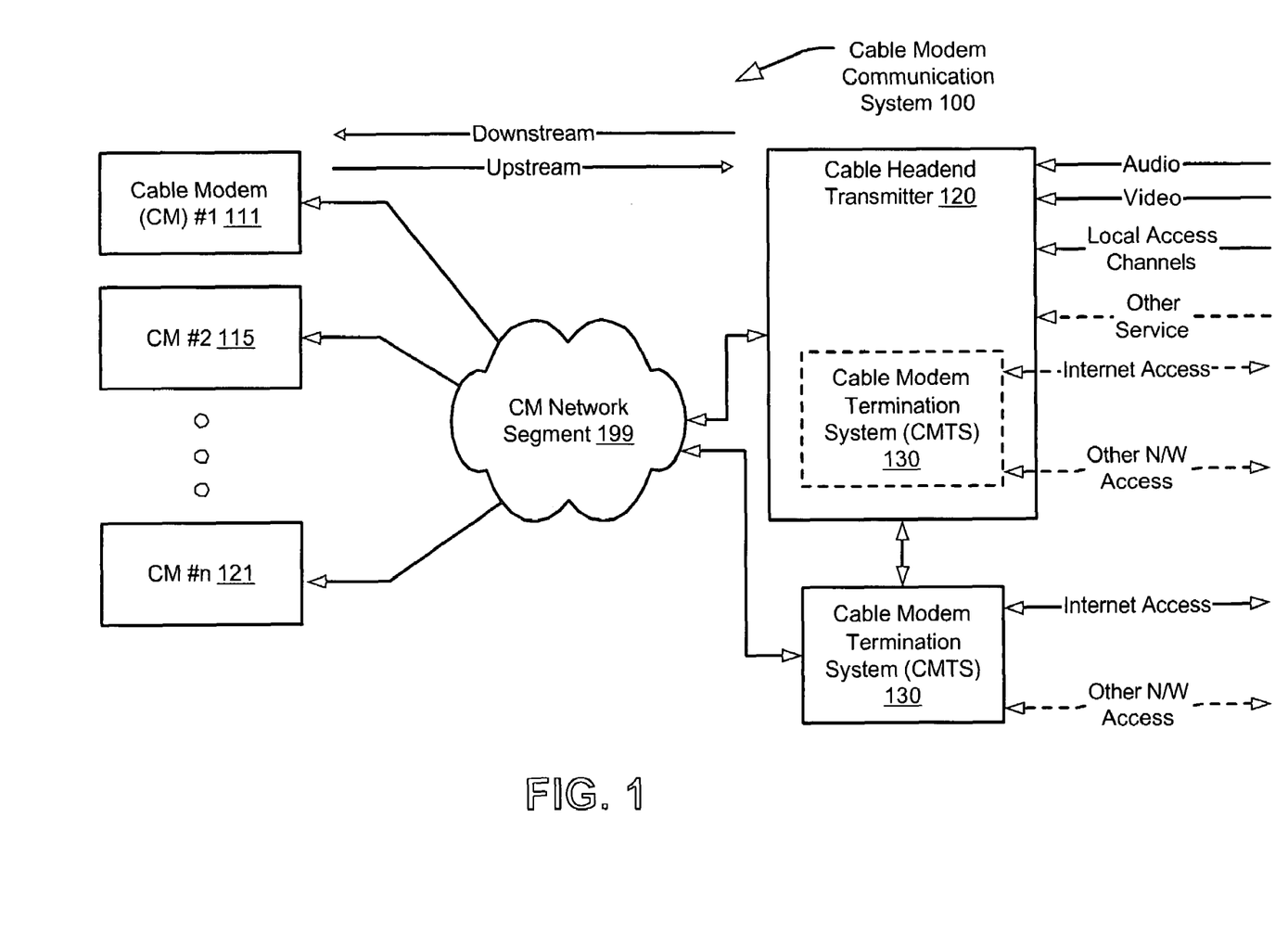
FIG. 1 is a system diagram illustrating a Cable Modem (CM) communication system constructed according to the present invention.

FIG. 1 is a system diagram illustrating a Cable Modem (CM) communication system 100 that is constructed according to/operating according to the present invention. The CM communication system 100 includes a plurality of CMs (shown as CM #1 111, a CM #2 115, . . . , and a CM #n 121), a Cable Headend Transmitter 120, and a CMTS 130 (that may reside internal to, or external to the Cable Headend Transmitter 120). Each of the CMs 111-121, the Cable Headend Transmitter 120, and the CMTS 130 communicatively couples to a CM network segment 199 that facilitates communications there between according to the present invention. While the CM network segment 199 is shown as a single entity, it is understood that the CM network segment 199 includes a plurality of elements including cable media, routers, splitters, couplers, relays, and amplifiers, for example, without departing from the scope and spirit of the invention. In the illustrated embodiment, the CM network segment 199 includes both coaxial cable and fiber media and is a Hybrid Fiber Coaxial (HFC) system. In some embodiments of the present invention, the CM communication system 100 operates consistently with one or more versions of the Data Over Cable System Interface Specification (DOCSIS), and particularly according to the ITU-T J.83B Annex to DOCSIS.

The CM network segment 199 supports communications between the CMs 111-121, the Cable Headend Transmitter 120, and the CMTS 130. The CMTS 130 may be located at a local office of a cable television company or at another location within a CM communication system. The Cable Headend Transmitter 120 provides a number of services including audio programming, video programming, local access channels, as well as any other service known in the art of cable systems. Each of these services is provided to one or more users corresponding to CMs 111-121. However, as is known, cable subscribers may receive Cable Headend Transmitter 120 service without receiving CMTS 130 service, and vice versa.

The service provider employs the CMTS 130 to provide network access services to the CMs 111-121, e.g., allows the users to access the Internet, Wide Area Networks, and other data services via the CMTS 130. The CMTS 130 provides many of the same functions provided by a digital subscriber line access multiplexer (DSLAM) within a digital subscriber line (DSL) system. The CMTS 130 receives incoming traffic in from the CMs 111-121 and routes it to an Internet Service Provider (ISP) for coupling to the Internet, as shown via the Internet access. At the CMTS 130, the CM service provider includes a number of resources for providing third-party ISP access, accounting and logging purposes, dynamic host configuration protocol (DHCP) assignment and administration, the storage of Internet protocol (IP) addresses for the CMs 111-121, and server control for the Data Over Cable Service Interface Specification (DOCSIS), a major standard used by U.S. cable systems in providing Internet access to users.

Downstream information flows to the CMs 111-121 from the CMTS 130. Upstream information flows from the CMs 111-121 to the CMTS 130. In a typical installation, the CMTS 130 services as many as 1,000 CMs 111-121 on a single 6 MHz bandwidth channel. Since a single channel having a bandwidth of 6 MHz is capable of 30-40 megabits per second of total throughput, the CMTS 130 via the CM network segment 199 is capable of serving the 1,000 CMs 111-121 with significantly better performance than is available with standard dial-up modems or even ISDN service.

Figure 2:
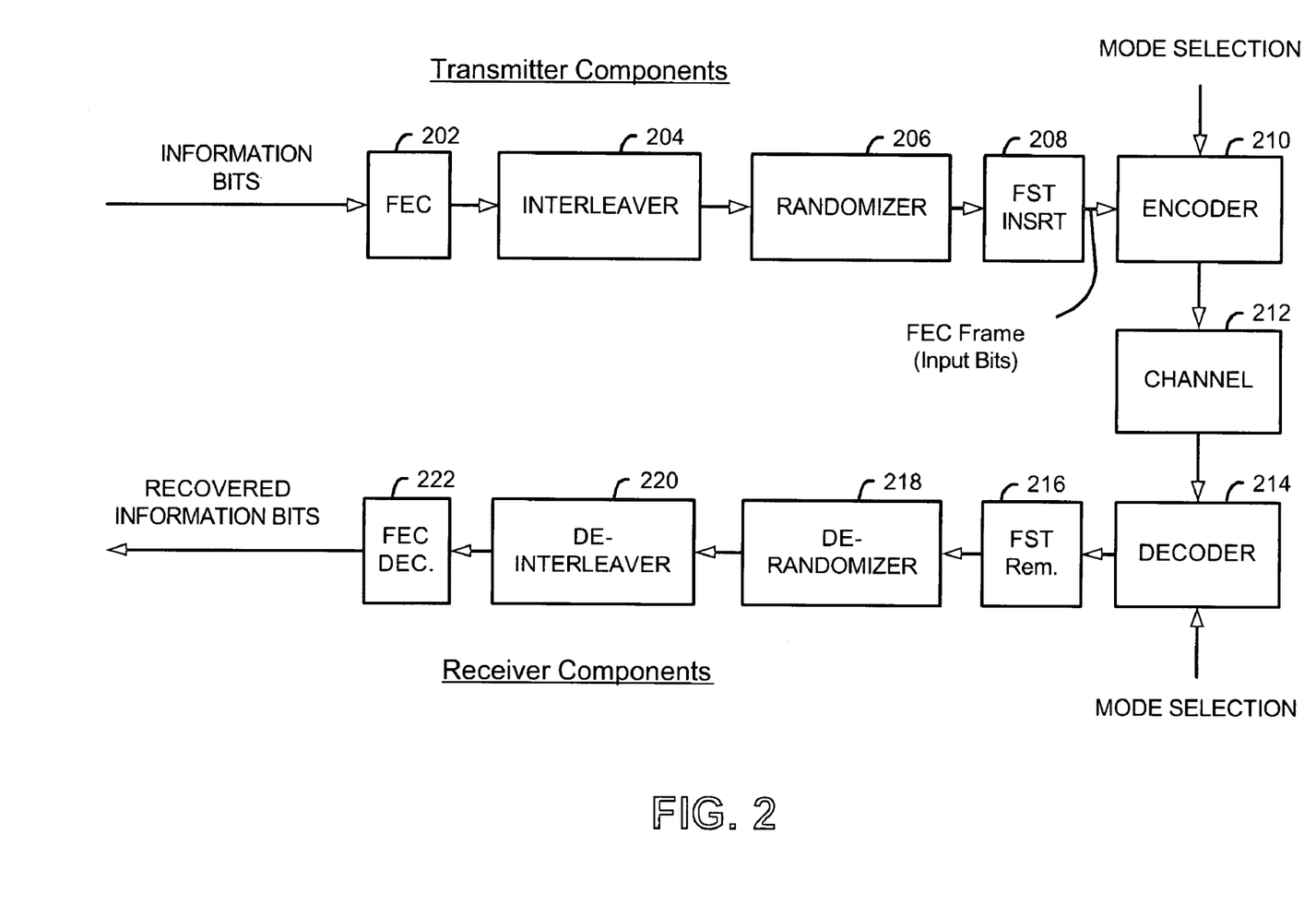
FIG. 2 is a block diagram illustrating the communication path of a communication system that may operate according to the present invention.

FIG. 2 is a block diagram illustrating the communication path of a communication system that may operate according to the present invention. The communication path may be an upstream or downstream path in the CM communication system 100 of FIG. 1. Alternately, the communication path may reside within another digital communication system, e.g., satellite communication system, fixed wireless communication system, cellular wireless communication system, wired communication system, etc. The components illustrated in FIG. 2 are a subset of the components that are contained within a communication device.

A forward error correction (FEC) coder 202 of a transmitter receives information bits and codes the plurality of information bits to produce a plurality of FEC blocks. The FEC coder 202 may employ Reed-Solomon or another type of FEC coding. Interleaver 204 receives the plurality of FEC blocks from FEC block 202 and interleaves the FEC blocks. A randomizer 206 couples to the output of interleaver 204, receives the interleaved FEC blocks, and randomizes the FEC blocks. In combination, the interleaver 204 and the randomizer 206 receive a plurality of FEC blocks from FEC coder 202 and operate upon the FEC blocks to produce a plurality of interleaved and randomized FEC blocks. Frame synch trailer (FST) insert operator 208 appends frame synch trailers to the plurality of interleaved and randomized FEC blocks to form an FEC frame.

Encoder 210 receives the FEC frame and maps the bits of the FEC frame to modulation symbols according to an embodiment of the present invention. The encoder 210 produces a plurality of modulation symbols that are transmitted via channel 212 to a decoder 214 located in a receiver. The encoder 210 of FIG. 2 maps input bits of the FEC frame to modulation symbols according to an embodiment of the present invention that will be described further with reference to FIGS. 3-12. The modulation symbols produced by the encoder 210 may be converted in frequency prior to their transmission upon the channel 212. As will be illustrated further in FIGS. 4 and 11, the encoder 210 may use coding such as trellis coding, convolutional coding, Turbo Coding, or another type of channel coding.

Decoder 214 receives the plurality of symbols that have been operated on by channel 212 and decodes the plurality of symbols to produce a decoded output (according to the coding employed by encoder 210). The output of decoder 214 is received by a FST removal operator 216 that removes the frame synch trailer and/or otherwise operates upon the output of the decoder 214. The output of the FST removal operator 216 is received by de-randomizer 218, which de-randomizes and then by de-interleaver 220 that de-interleaves the received data. The output of de-interleaver 220 is received by the FEC decoder 222, which performs FEC decoding upon the received data bits. FEC decoder 222 produces recovered information bits that correspond exactly to the information bits absent errors introduced by the channel 212 and/or other components of the communication path.

Figure 3:
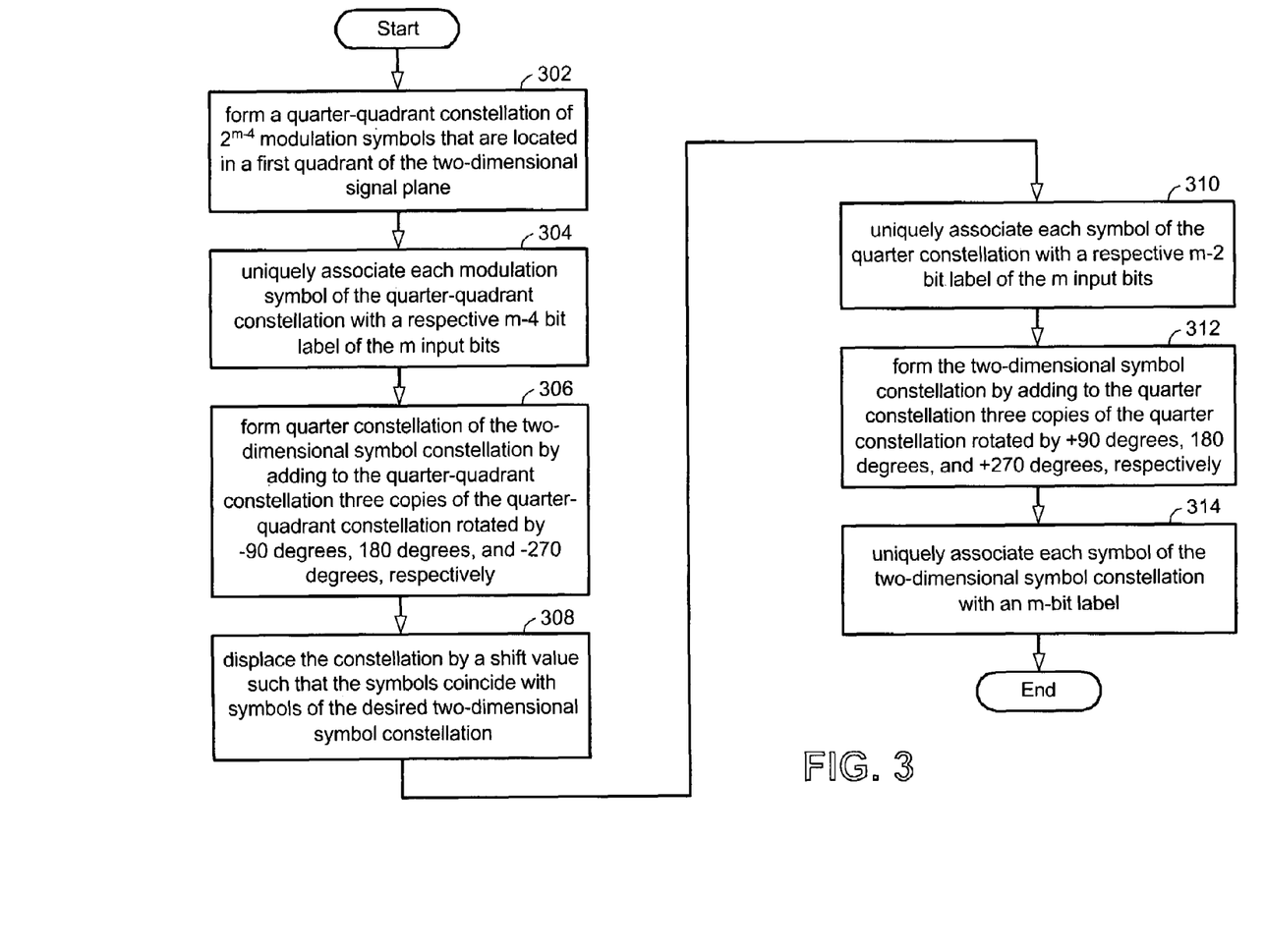
FIG. 3 is a flow chart illustrating operation according to a first embodiment of the present invention.

FIG. 3 is a flow chart illustrating operation according to a first embodiment of the present invention. The operation of FIG. 3 maps m input bits to $2^m$ modulation symbols of a two-dimensional constellation. The encoder 210 of FIG. 2, for example may employ the two-dimensional mappings determined according to the operation of FIG. 3. Mapping of the m input bits to the $2^m$ modulation symbols commences in forming a quarter-quadrant constellation of $2^{m-4}$ modulation symbols that are located in a first-quadrant of the two-dimensional signal plane (step 302). The quarter-quadrant constellation formed has $\frac{1}{16}^{th}$ the size of the two-dimensional constellation. The illustrated embodiment of the present invention supports higher order constellations, e.g., QAM constellations. The methodology illustrated in FIG. 3 may be applied to a set of constellations so that mapping of the constellations is consistent across the set of constellations. FIGS. 7A through 9B illustrate the manner in which higher-order constellations are formed according to the present invention, with particular reference to 256-QAM through 1024-QAM constellations. Of course, the teachings of the present invention may be applied to still larger constellations.

The method next includes uniquely associating each modulation symbol of the quarter-quadrant constellation with a respective m-4 bit label of the m input bits (step 304). A quarter constellation of the two-dimensional symbol constellation is then formed by adding to the quarter-quadrant constellation three copies of the quarter-quadrant constellation (step 306). The three copies of the quarter-quadrant constellation that are added are rotated by −90 degrees, 180 degrees, and −270 degrees, respectively. The quarter constellation is then shifted by a shift value Δ such that the symbols coincide with the symbols of the desired two-dimensional symbol constellation (step 308). When formed, the quarter constellation has $\frac{1}{4}^{th}$ the size of the two-dimensional symbol constellation. The operations of step 308 may be merged with the operations of step 306 in forming the quarter constellation.

With the quarter constellation of the two-dimensional symbol constellation formed, the method includes uniquely associating each symbol of the quarter constellation with a respective m-2 bit label of the m input bits (step 310). Of the m-2 bit label of the m input bits, m-4 bits of the m-2 bit label are inherited from the quarter-quadrant constellation and two further bits of the m-2 bit label are used to distinguish quarter-quadrants of the quarter constellation.

Next, the method includes forming the two-dimensional symbol constellation by adding to the quarter constellation (formed at step 306-310), by adding to the quarter constellation three copies of the quarter constellation rotated by +90 degrees, 180 degrees, and +270 degrees, respectively (step 312). Finally, with the two-dimensional constellation formed from the quarter constellations, the method includes uniquely associating each symbol of the two-dimensional symbol constellations with an m-bit label (step 314). Of the m-bit label, m-2 bits are inherited from the quarter constellation and two further bits of the m input bits are used to distinguish quarters of the two-dimensional symbol constellation.

In one particular embodiment of step 310, of the two further bits of the m-2 bit label used to distinguish quarter-quadrants of the quarter constellation a value of [00] may correspond to a first quarter-quadrant of the quarter constellation having the quarter-quadrant constellation, a value of [01] corresponds to a second quarter-quadrant of the quarter constellation having a quarter-quadrant constellation that has been rotated by −90 degrees, a value of [11] corresponds to a third quarter-quadrant of the quarter constellation having a quarter-quadrant constellation that has been rotated by 180 degrees, and a value of [10] corresponds to a fourth quarter-quadrant of the quarter constellation having a quarter-quadrant constellation that has been rotated by −270 degrees.

Figure 4:
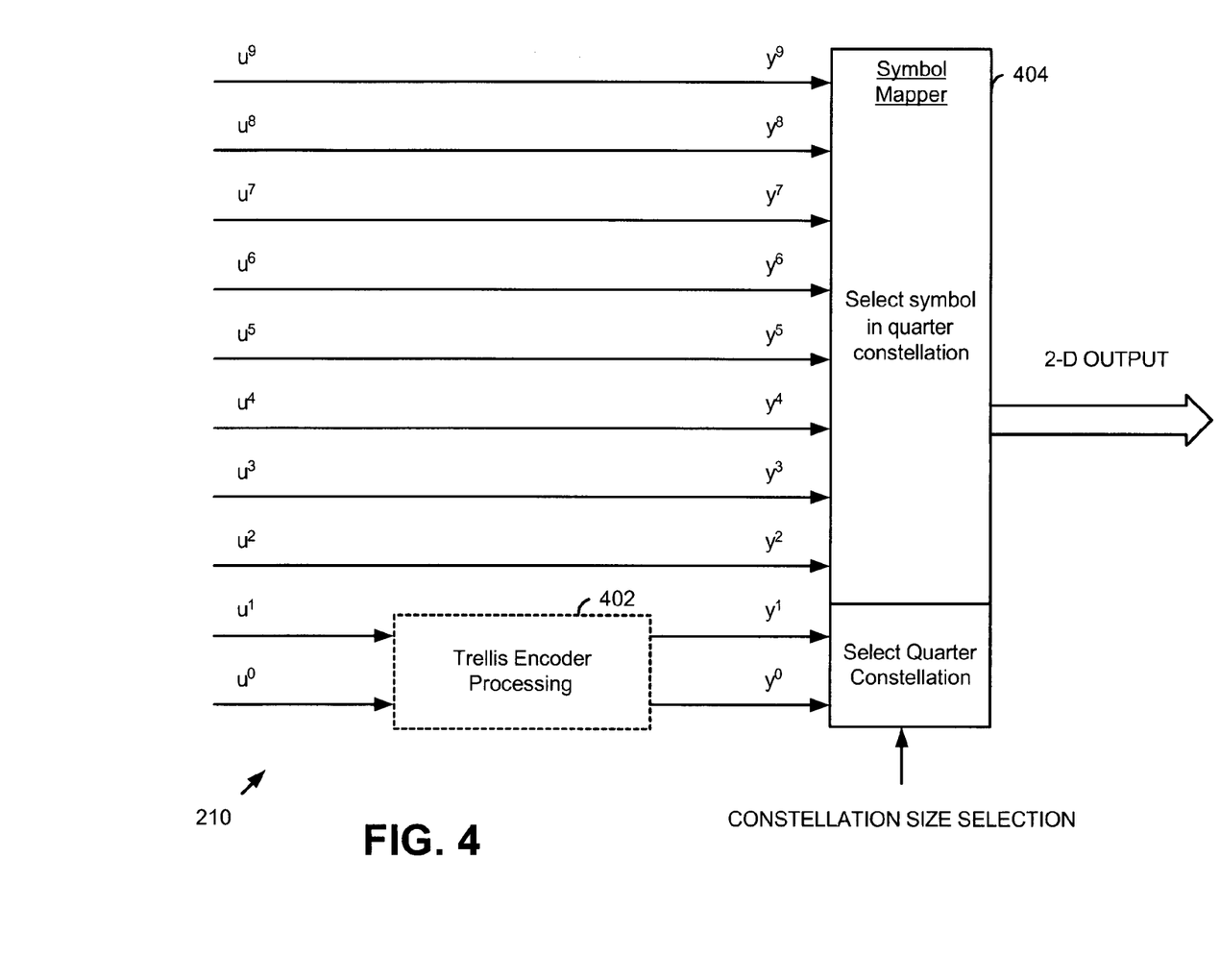
FIG. 4 is a block diagram illustrating an encoder constructed according to an embodiment of the present invention.

In one particular embodiment of step 314, of the two further bits of the m input bits used to distinguish quarters of the two-dimensional symbol constellation, a value of [00] corresponds to a first quadrant of the two-dimensional symbol constellation having the quarter constellation, a value of [01] corresponds to a second quadrant of the two-dimensional symbol constellation having a quarter constellation that has been rotated by −90 degrees, a value of [11] corresponds to a third quadrant of the two-dimensional symbol constellation having a quarter constellation that has been rotated by 180 degrees, and a value of [10] corresponds to a fourth quadrant of the two-dimensional symbol constellation having a quarter constellation that has been rotated by −270 degrees FIG. 4 is a block diagram illustrating an encoder 210 constructed according to an embodiment of the present invention. The encoder 210 includes trellis encoder processing 402 and a variable rate symbol mapper 404. One particular embodiment of the trellis encoder processing 402 is shown in more detail in FIG. 11. The trellis encoder processing 402 operates upon bits $u^0$ to $u^9$ to produce input bits $y^0$ to $y^9$. Note that the illustrated number of bits operated upon by the symbol mapper 404 is ten, which corresponds to a 1024-QAM constellation. When a servicing channel supports a smaller or larger constellation size, the number of bits operated upon will be lesser or greater, respectively. Because the quality of the servicing channel 212 (of FIG. 2) varies over time, at any particular time, the symbol mapper 404 should use a constellation size consistent with the quality of the servicing channel 212.

The variable rate symbol mapper 404 maps input bits $y^0$ to $y^9$ to two-dimensional symbol constellations according to the symbol mapping of the present invention (as was described with reference to FIG. 3). Symbol mapper 404 produces a two-dimensional symbol constellation as its output. A constellation size selection input to the symbol mapper 404 selects a constellation size for mapping of input bits $y^0$ to $y^9$ (or a subset or superset thereof) to a two-dimensional symbol constellation.

Figures 5A, 5B:
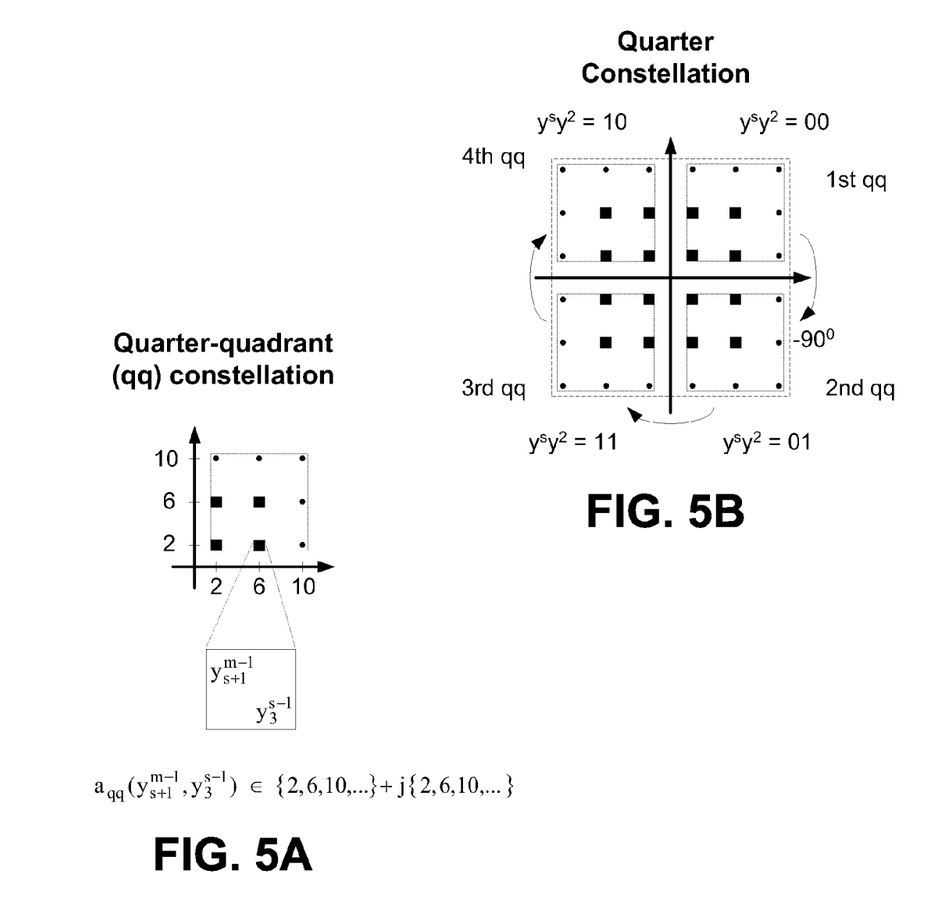
FIGS. 5A, 5B, 5C, and 6 are diagrams illustrating a generalized mapping of input bits to modulation symbols according to an embodiment of the present invention.

FIGS. 5A, 5B, 5C, and 6 are diagrams illustrating a generalized mapping of input bits to modulation symbols according to an embodiment of the present invention. FIG. 5A illustrates the formation of a quarter-quadrant constellation that includes a plurality of modulation symbols. With m input bits mapped to a $2^m$ constellation according to the present invention, the quarter-quadrant constellation includes $2^{m-4}$ modulation symbols. The m input bits are denoted as $y^{m-1}, y^{m-2}, \ldots y^{s+1}, y^s, y^{s-1}, \ldots y^3, y^2, y^1, y^0$ with $y_0{}^{m-1} \triangleq [y^{m-1}, y^{m-2}, \ldots y^{s+1}, y^s, y^{s-1}, \ldots y^3, y^2, y^1, y^0]$ being the symbol labels associated with the symbols of a $2^m$-QAM constellation. M−4 input bits of the m−4 input bits uniquely associate with the $2^{m-4}$ modulation symbols of the quarter-quadrant constellation. The particular m−4 input bits of the m input bits associated with the $2^{m-4}$ modulation symbols of the quarter-quadrant constellation depend upon the particular embodiment. FIGS. 7A and 7B, FIGS. 8A and 8B, and FIGS. 9A and 9B, illustrate particular embodiments of quarter-quadrant mappings for 256-QAM, 512-QAM, and 1024-QAM constellations, respectively.

Referring now to FIG. 5B, a quarter constellation of the two-dimensional symbol constellation is formed by adding to the quarter-quadrant constellation three copies of the quarter-quadrant constellation. The three copies of the quarter-quadrant constellation added are rotated by −90 degrees, 180 degrees, and −270 degrees, respectively. The symbol labels of the four combined quarter-quadrant constellations are associated with the label bits $y^s y^2$=[00], [01], [11], [10] in the illustrated embodiment.

Figure 5C:
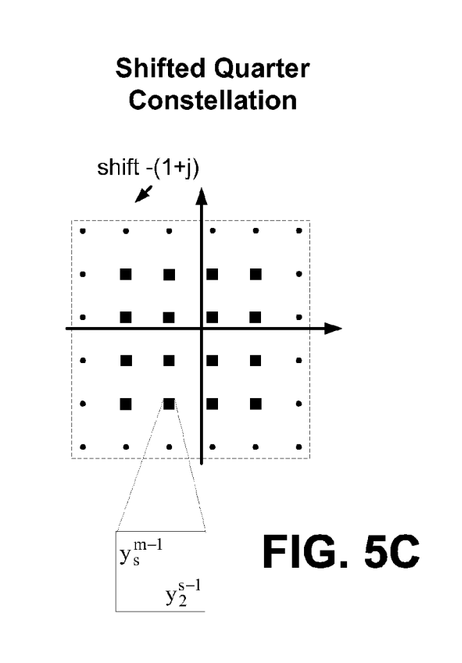

FIG. 5C illustrates the quarter constellation after it has been shifted so that it corresponds to the symbols of the desired two-dimensional symbol constellation. In the embodiment of FIG. 5C, the quarter constellation is shifted by −(1+j). This effectively shifts the quarter constellation toward the center of the two-dimensional symbol constellation.

Figure 6:
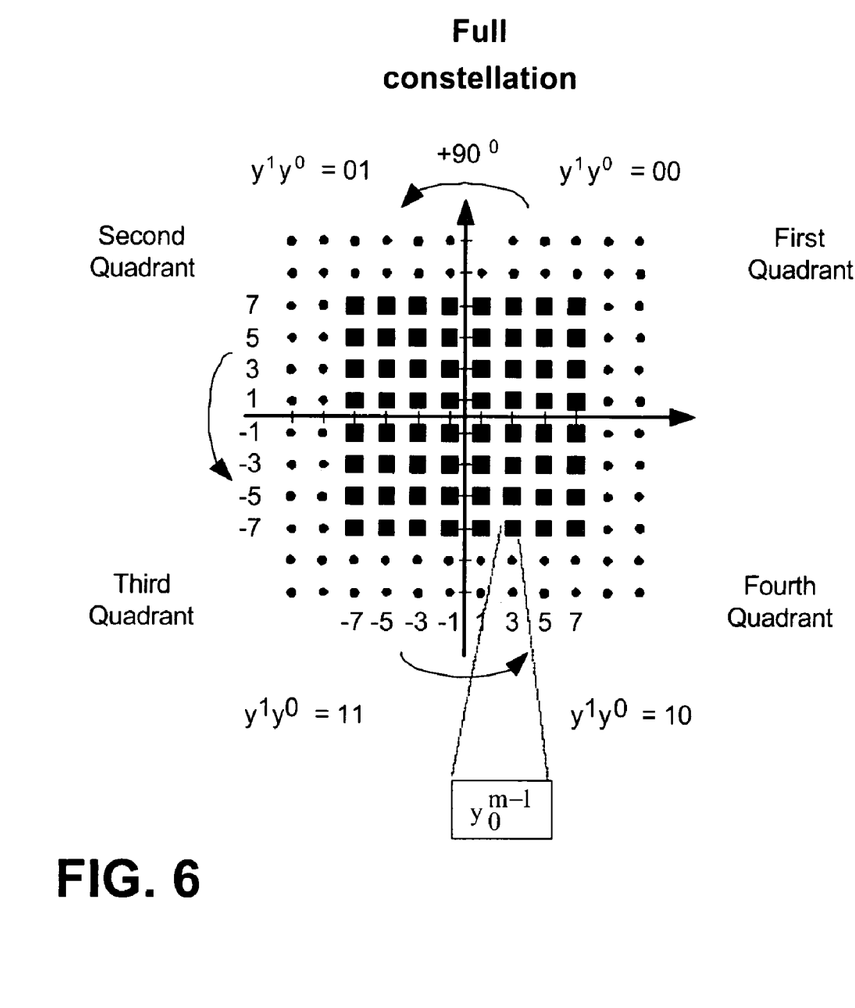

FIG. 6 is a diagram illustrating a full constellation having input bits mapped to modulation symbols according to the present invention. As shown in FIG. 6, the full constellation is formed from copies of the shifted quarter constellation (of FIG. 5C) with additional bits of the m input bits used to distinguish quadrants of the full constellation. A Full $2^m$ QAM constellation is obtained by combining the quarter constellation with three copies successively rotated by +90°. The symbol labels in the four rotated quarter constellations are associated with the label bits $y^1 y^0 = [00], [01], [11], [10]$. The symbols of the full $2^m$ QAM constellation may be obtained algorithmically from the symbols of the quarter-quadrant constellation by:

$$a(y_0^{m-1}) = [a_{qq}(y_{s+1}^{m-1}, y_3^{s+1}) \times R_1 - (1+j)] \times R_0, \quad \text{Equation (1)}$$

where $R_1 = j^{-2y^s - (y^s \oplus y^2)}$, $R_0 = j^{2y^1 + (y^1 \oplus y^0)}$.

Figure 7A:
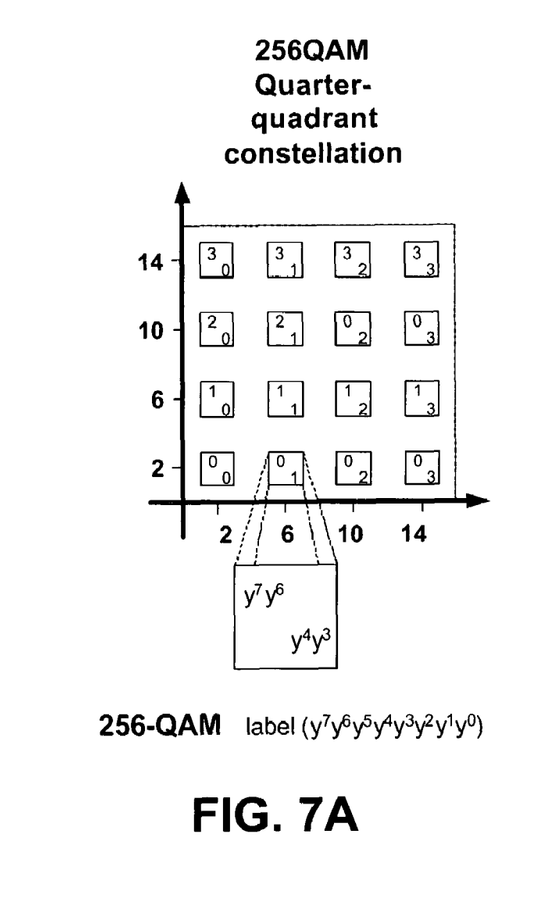
FIGS. 7A and 7B are diagrams illustrating aspects of the present invention as employed in forming a 256 quadrature amplitude modulated (QAM) constellation.
Figure 7B:
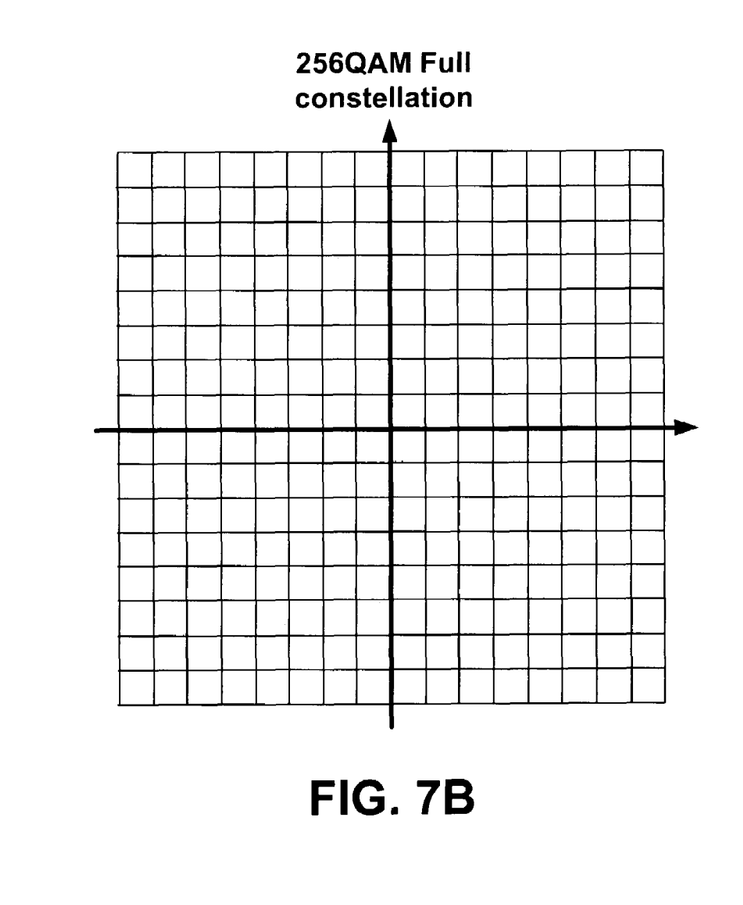

FIGS. 7A and 7B are diagrams illustrating aspects of the present invention as employed in forming a 256 quadrature amplitude modulated (QAM) constellation. As shown in FIG. 7A, a 256-QAM quarter-quadrant constellation includes a plurality of modulation symbols each of which is uniquely associated with a subset of the m input bits. For the 256-QAM constellation illustrated, the m input bits include $y^7 - y^0$ for a total of 8-input bits. In such case, m−4 input bits $y^7, y^6, y^4$, and $y^3$ uniquely associate with the modulation symbols of the quarter-quadrant constellation. Such unique association is shown in particular in FIG. 7A. For the 256-QAM constellation, the full two-dimensional symbol constellation includes 256 unique modulation symbols. Thus, each quadrant includes 64 modulation symbols and each quarter-quadrant includes 16 modulation symbols. As is shown in FIG. 7B, the 256-QAM full constellation includes 256 modulation symbols each of which is associated with the unique value of the 8 input bits.

To summarize the relationship between the m input bits of the full 256-QAM constellation of FIG. 7B and the methodology of FIG. 3, the m input bits include eight bits [$y^7, y_6, y^5, y^4, y^3, y^2, y^1, y^0$]. The m−4 bits that uniquely associate with $2^{m+}$symbols of the quarter-quadrant constellation are bits [$y^7, y^6, y^4, y^3$]. The two further bits of the m−2 bit label that distinguish quarter-quadrants are bits [$y^5, y^2$]. Finally, the two further bits of the m input bits that distinguish quadrants of the full constellation are bits [$y^1, y^0$].

Figure 8A:
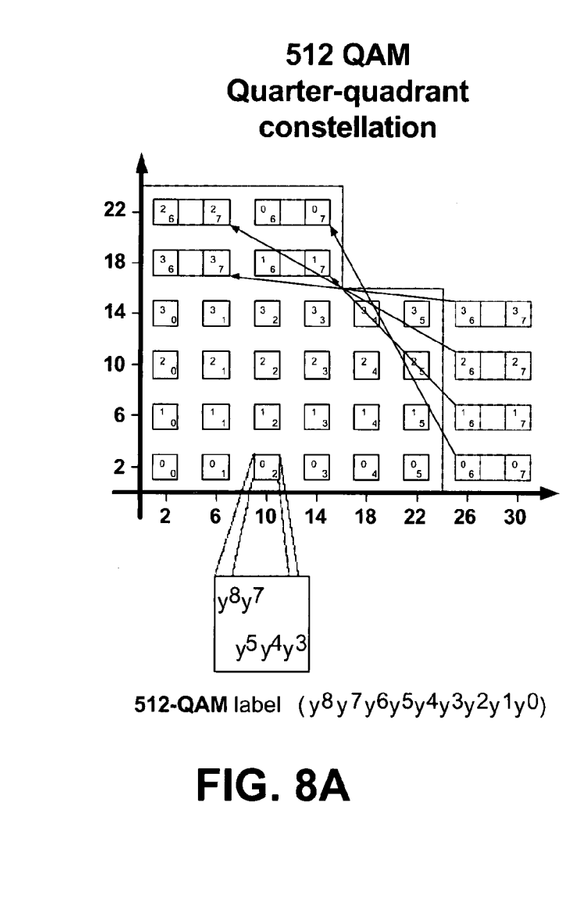
FIGS. 8A and 8B are diagrams illustrating aspects of the present invention when applied to a 512-QAM constellation.
Figure 8B:
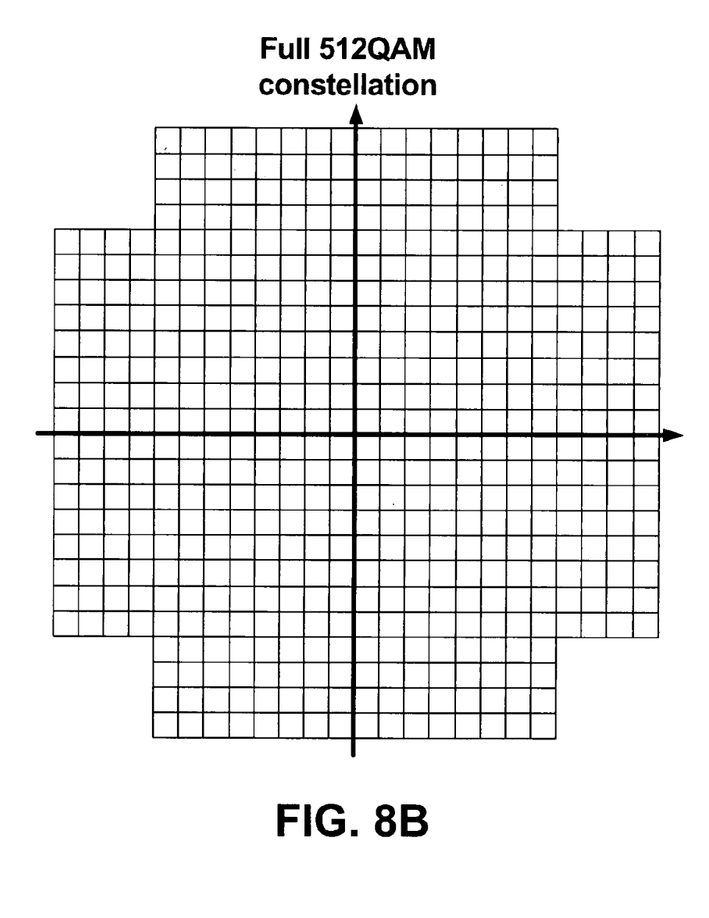

FIGS. 8A and 8B are diagrams illustrating aspects of the present invention when applied to a 512-QAM constellation. As contrasted to the 256-QAM constellation of FIGS. 7A and 7B, the 512-QAM constellation of FIG. 8B is not a square constellation but instead is a cross constellation. Because the 512-QAM constellation is not square, formation of the constellation according to an embodiment of the present invention includes repositioning a plurality of quarter constellation symbol positions when forming the quarter constellation. FIG. 8A illustrates one example of such repositioning. Different embodiments of the present invention may employ differing manners of repositioning the plurality of quarter constellation symbols.

To summarize the relationship between the m input bits of the full 512-QAM constellation of FIG. 8B and the methodology of FIG. 3, the m input bits include nine bits [$y^8, y^7, y^6, y^5, y^4, y^3, y^2, y^1, y^0$]. The m−4 bits that uniquely associate with the $2^{m-4}$ symbols of the quarter-quadrant constellation are bits [$y^8, y^7, y^6, y^4, y^3$]. The two further bits of the m−2 bit label that distinguish quarter-quadrants are bits [$y^5, y^2$]. Finally, the two further bits of the m input bits that distinguish quadrants of the full constellation are bits [$y^1, y^0$].

Figure 9A:
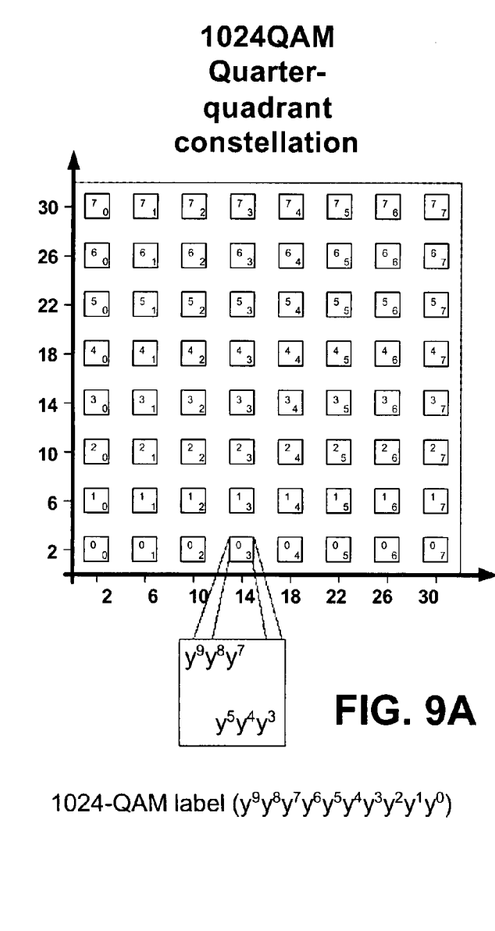
FIGS. 9A and 9B are diagrams illustrating aspects of the present invention as applied to a 1024-QAM constellation.
Figure 9B:
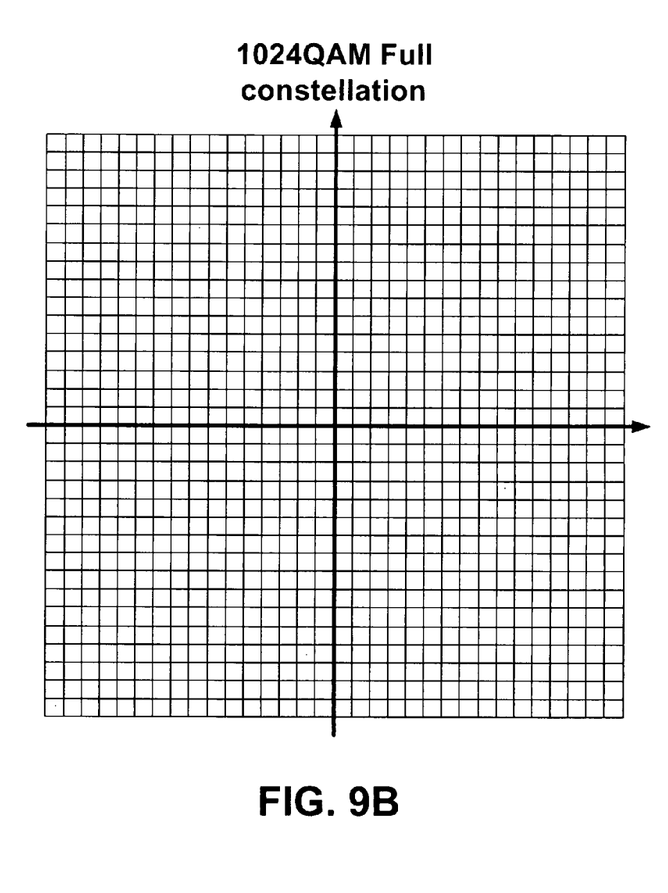

FIGS. 9A and 9B are diagrams illustrating aspects of the present invention as applied to a 1024-QAM constellation. FIG. 9A illustrates the unique association between modulation symbols of the quarter-quadrant constellation with the respective m−4 bit label of the m input bits. With the 1024-QAM quarter-quadrant constellation, the m input bits include ten bits [$y^9, y^8, y^7, y^6, y^5, y^4, y^3, y^2, y^1, y^0$]. The m−4 bits that uniquely associate with the $2^{m-4}$ symbols of the quarter-quadrant constellation are bits [$y^9, y^8, y^7, y^5, y^4, y^3$]. The two further bits of the m-2 bit input bits that distinguish quadrants of the full constellation are bits [$y^1, y^0$].

Figure 10:
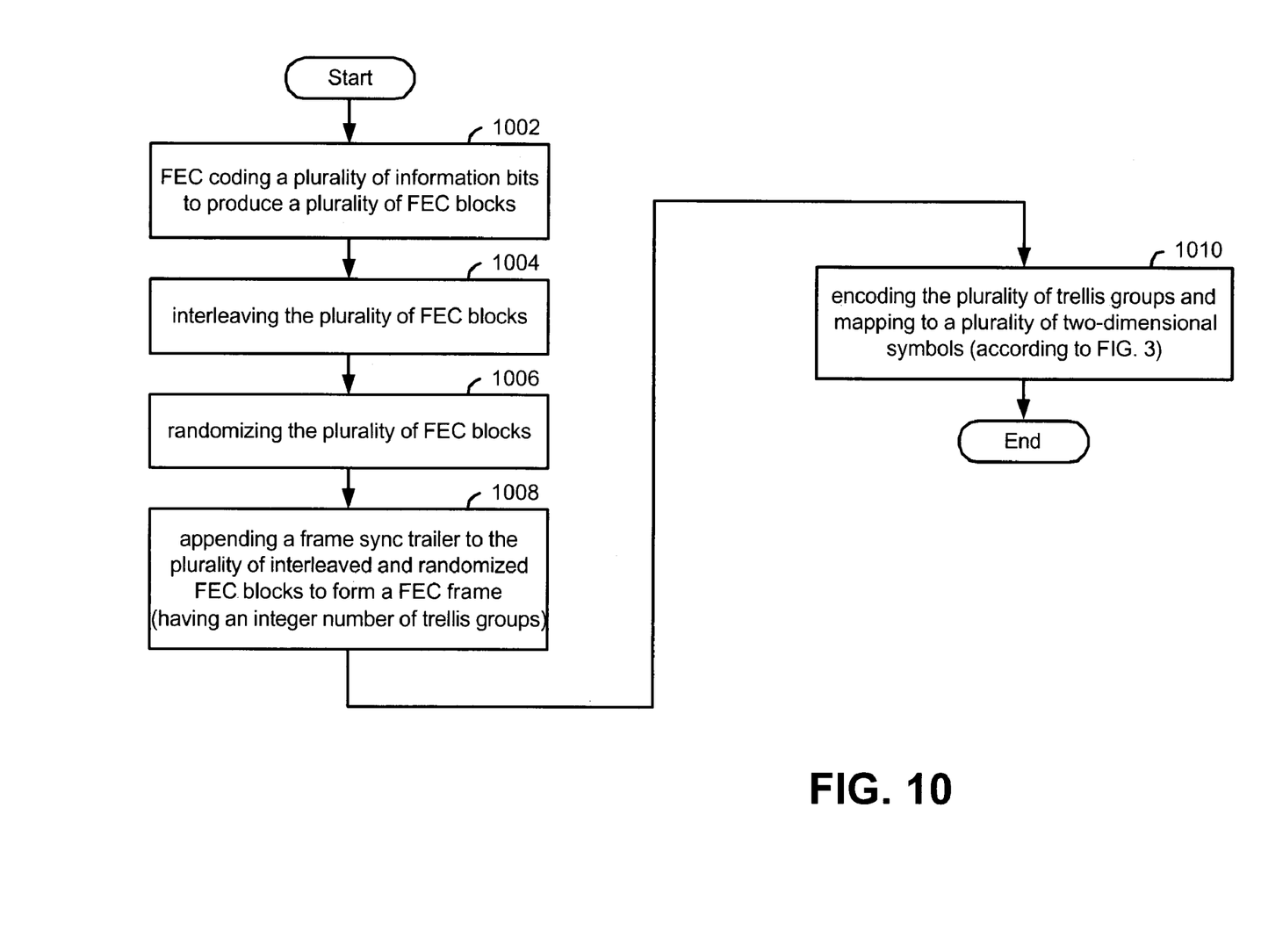
FIG. 10 is a flow chart illustrating operation according to the present invention in creating input bits from information bits according to an embodiment of the present invention.

FIG. 10 is a flow chart illustrating operation according to the present invention in creating input bits from information bits according to an embodiment of the present invention. The operation of FIG. 10 is simply one example of a manner in which the plurality of input bits may be constructed. The operations of FIG. 10 are substantially consistent with the standardized operations of the J.83 annex to DOCSIS. The operations of FIG. 10 are also consistent with the structure of FIG. 2 and the operations of FIG. 3.

Operation commences at step 1002 wherein FEC coding is performed on the plurality of information bits to produce a plurality of FEC blocks. As will be described further with reference to FIGS. 11 and 12 the FEC coding operation depends upon the constellation size employed. In one particular embodiment, Reed-Solomon encoding is employed to operate upon the information bits to produce the FEC blocks. With the FEC blocks formed, the FEC blocks are then interleaved at step 1004 and randomized at step 1006. Then, a frame synch trailer is appended to the plurality of interleaved and randomized FEC blocks to form an FEC frame (step 1008). The FEC frame has an integer number of trellis groups so that the FEC frame may be trellis encoded. The plurality of trellis groups of the FEC frame are then trellis encoded and mapped to a plurality of two-dimensional symbols (step 1010).

Figure 11:
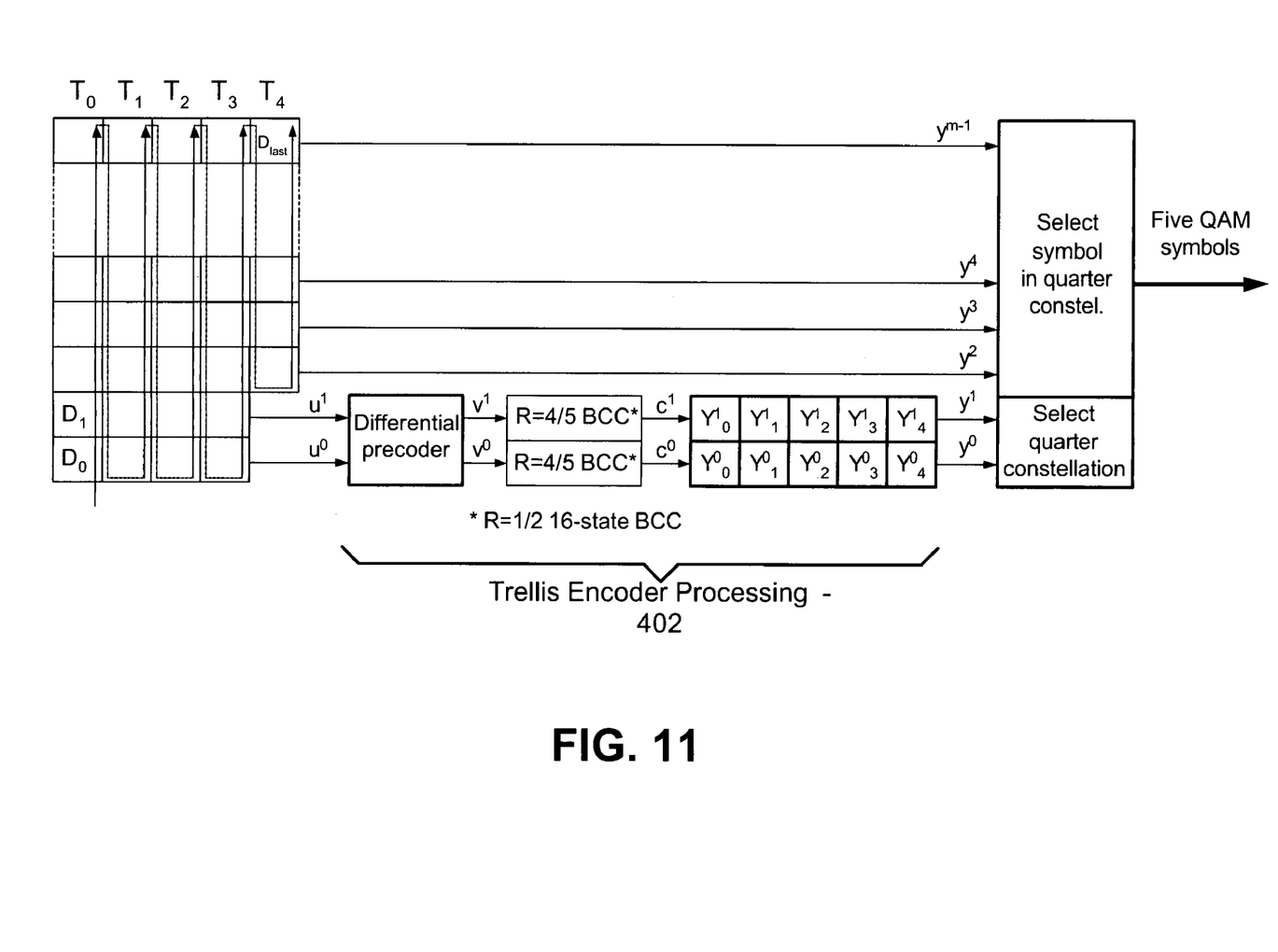
FIG. 11 is a block diagram illustrating an encoder that employs trellis encoding operations according to an aspect of the present invention.

FIG. 11 is a block diagram illustrating an encoder that employs trellis encoding operations according to an aspect of the present invention. As shown in FIG. 11, trellis encoder processing 402 includes a differential precoder and a block convolutional coder (BCC) that produce trellis bits $y^0$ and $y^1$. These trellis bits are employed to select a quarter constellation of a two-dimensional symbol constellation constructed according to the present invention. In the example of FIG. 11, five trellis groups are operated upon at one time to produce 5-QAM symbols. The size of the trellis groups is directly related to the size of the QAM symbols employed in the particular operation. As was previously described, the size of the constellation employed depends upon channel conditions and may depend upon the capabilities of receiving device.

Figure 12:
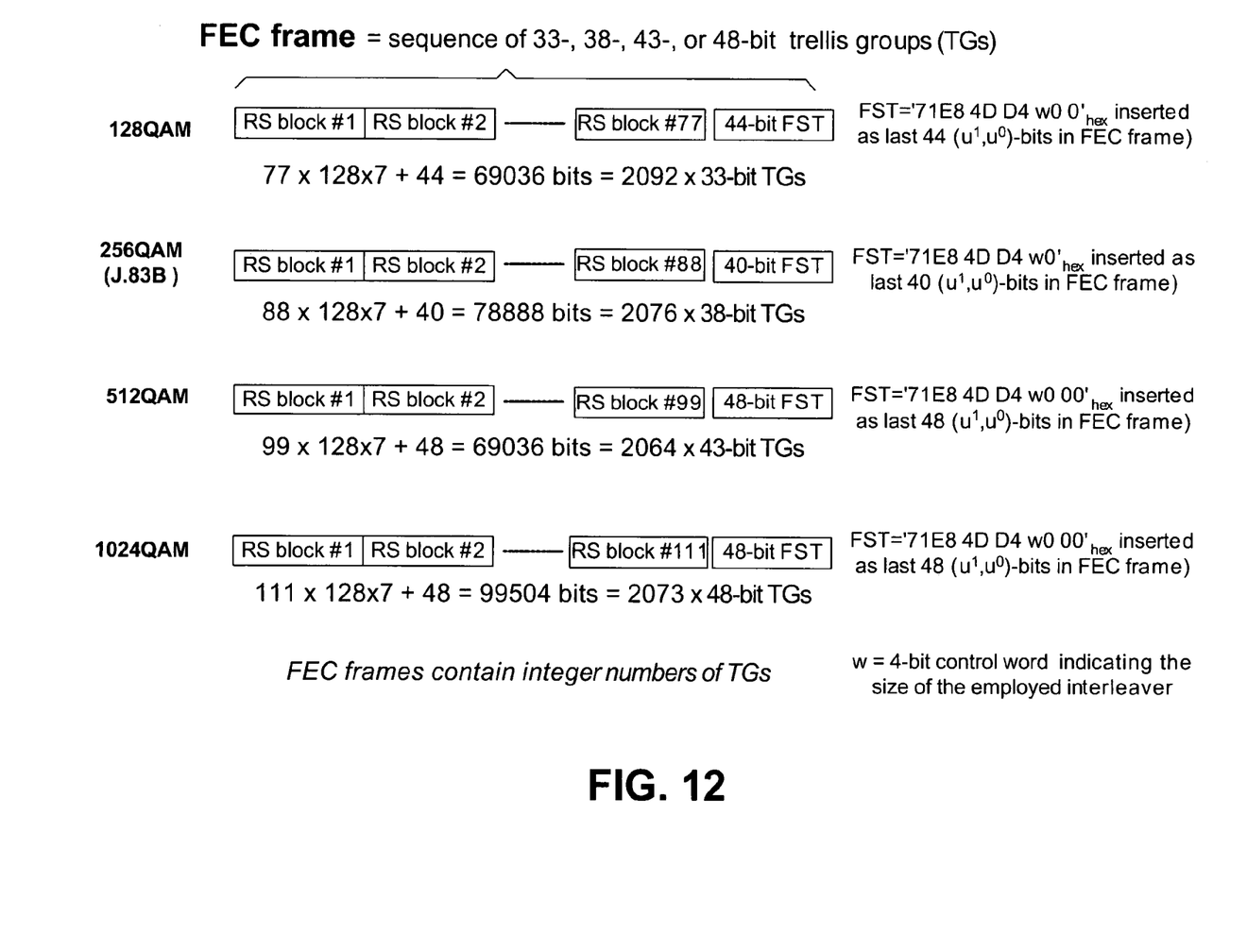
FIG. 12 is a diagram illustrating the manner in which forward error correction frames may be constructed according to various embodiments of the present invention.

FIG. 12 is a diagram illustrating the manner in which forward error correction frames may be constructed according to various embodiments of the present invention. With the embodiments of FIG. 12, the FEC frame structures depend upon the constellation size of a two-dimensional symbol constellation employed. FEC frame structures are chosen such that all frames comprise an integer number of Reed-Solomon code words, comprise an integer number of trellis groups, have similar temporal length, and allow for at least 40 Frame Synch Trailer (FST) bits. 256-QAM FEC frames may be constructed according to annex J.83B of DOCSIS, for example. The manner in which other FEC frames are constructed are examples of particular embodiments and vary from embodiment to embodiment.

Referring now to FIGS. 2, 10, 11, and 12, a 256-QAM FEC frame includes 88 RS code words that have been interleaved and scrambled and appended with 40 Frame Synch Trailer (FST) bits. The FST bits are inserted "as the last ($u^1, u^0$) bits" within a FEC frame. Thus, the length of a FEC frame is 78'888 bits. The 78'888 bits of a FEC frame are divided into 2076 blocks of 38 bits, which are referred to as trellis groups (TGs). The trellis encoder 210 converts the sequence of TGs into blocks of five 256 QAM symbols per input TG. Trellis coding therefore occurs at a code rate of 38/5×8=0.95.

The 38 bits $D_0, D_1, \ldots D_{37}$ of one TG are arranged prior to trellis encoding and modulation as depicted in FIG. 11. Trellis encoding is accomplished by the Differential Precoder and two parallel rate R=4/5 Binary Convolutional enCoders (BCCs), whose functions are detailed in the J.83B annex to DOCSIS. During one TG period, bits $D_1, D_9, D_{17}, D_{25}$ enter sequentially the differential encoder as bits $u^1$, while bits $D_0, D_8, D_{16}, D_{24}$ enter sequentially the differential precoder as bits $u^0$. The differential precoder generates during one TG period four bits $v^1$ and four bits $v^0$. The four bits $v^1$ are encoded by the first BCC into 5 coded bits $Y^1_0, Y^1_1, Y^1_2, Y^1_3, Y^1_4$. Similarly, the four bits $v^0$ bits are encoded by the second BCC into 5 coded bits $Y^0_0, Y^0_1, Y^0_2, Y^0_3, Y^0_4$.

The 256-QAM symbol mapper translates symbol labels $y_0^7 \triangleq [y^7, y^6, y^5, y^4, y^3, y^2, y^1, y^0]$ into 256 QAM symbols. During on TG period, five 256 QAM symbols are generated. The label of the first symbol is $y_0^7 \triangleq [D_7, D_6, D_5, D_4, D_3, D_2, Y^1_0, Y^0_0]$; the label of the second symbol is $y_0^7 \triangleq [D_{15}, D_{14}, D_{13}, D_{12}, D_{11}, D_{10}, Y^1_1, Y^0_1]$; etc.; the label of the fifth symbol is $[D_{37}, D_{36}, D_{35}, D_{34}, D_{33}, D_{32}, Y^1_4, Y^0_4]$. The 256-QAM symbol mapping is given in the J.83B annex to DOCSIS in the form of a 16×16 array of cells, each containing an 8-bit $[y^7, y^6, y^5, y^4, y^3, y^2, y^1, y^0]$ in plain numerical form.

FIG. 12 also illustrates the manner in which TGs may be formed for 128-QAM constellations, 256-QAM constellations, 512-QAM constellations, and 1024-QAM constellations. For the 128-QAM constellation, each 33-bit TG includes bits: $D_0,D_1,D_2,D_3,D_4,D_5$, $D_6,D_7,D_8,D_9,D_{10},D_{11}$, $D_{12},D_{13},D_{14},D_{15},D_{16},D_{17},D_{18}$, $D_{19},D_{20},D_{21},D_{22},D_{23},D_{24}$, $D_{25},D_{26},D_{27},D_{28},D_{29},D_{30}$, $D_{31},D_{32}=D_{last}$, wherein the bolded bits serve as inputs to the Trellis encoder processing 402. For the 256-QAM constellation, each 38-bit TG includes bits: $D_0,D_1,D_2,D_3,D_4,D_5,D_6,D_7,D_8,D_9,D_{10},D_{11}$, $D_{12}$, $D_{13},D_{14},D_{15},D_{16},D_{17},D_{18},D_{19},D_{20},D_{21},D_{22},D_{23},D_{24}$, $D_{25}$, $D_{26},D_{27},D_{28},D_{29},D_{30},D_{31},D_{32},D_{33},D_{34},D_{35},D_{36}$, $D_{37}=D_{last}$, wherein the bolded bits serve as inputs to the Trellis encoder processing 402. For the 512-QAM constellation, each 43-bit TG includes bits: $D_0,D_1,D_2,D_3,D_4,D_5,D_6$, $D_7,D_8,D_9,D_{10},D_{11},D_{12},D_{13},D_{14}$, $D_{15},D_{16},D_{17},D_{18},D_{19},D_{20}$, $D_{21},D_{22},D_{23},D_{24},D_{25},D_{26},D_{27}$, $D_{28},D_{29},D_{30},D_{31},D_{32},D_{33}$, $D_{34},D_{35}, \ldots, D_{42}=D_{last}$, wherein the bolded bits serve as inputs to the Trellis encoder processing 402. Finally, for the 1024-QAM constellation, each 48 bit TG includes bits: $D_0,D_1,D_2,D_3,D_4,D_5,D_6,D_7,D_8,D_9,D_{10},D_{11}$, $D_{12},D_{13},D_{14}$, $D_{15},D_{16},D_{17},D_{18},D_{19},D_{20},D_{21},D_{22},D_{23},D_{24}$, $D_{25},D_{26},D_{27}$, $D_{28},D_{29}, D_{30},D_{31},D_{32},D_{33},D_{34},D_{35}, \ldots, D_{47}=D_{last}$, wherein the bolded bits serve as inputs to the Trellis encoder processing 402.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for forming and transmitting a communication including mapping m input bits to $2^m$ modulation symbols of a two-dimensional symbol constellation, where m is a positive integer greater than or equal to four, the method comprising:

forming a quarter-quadrant constellation of $2^{m-4}$ modulation symbols that are located in a first quadrant of the two-dimensional signal plane, the quarter-quadrant constellation having one-sixteenth the size of the two-dimensional symbol constellation;

uniquely associating each modulation symbol of the quarter-quadrant constellation with a respective m-4 bit label of the m input bits;

forming a quarter constellation of the two-dimensional symbol constellation by adding to the quarter-quadrant constellation three copies of the quarter-quadrant constellation rotated by −90 degrees, 180 degrees, and −270 degrees, respectively, and then displacing the quarter constellation by a shift value Δ such that the symbols coincide with symbols of the two-dimensional symbol constellation, wherein the quarter constellation has one-fourth the size of the two-dimensional symbol constellation;

uniquely associating each symbol of the quarter constellation with a respective m-2 bit label of the m input bits, wherein m-4 bits of the m-2 bit label are inherited from the quarter-quadrant constellation and two further bits of the m-2 bit label are used to distinguish quarter-quadrants of the quarter constellation;

forming the two-dimensional symbol constellation by adding to the quarter constellation three copies of the quarter constellation rotated by +90 degrees, 180 degrees, and +270 degrees, respectively;

uniquely associating each symbol of the two-dimensional symbol constellation with an m-bit label, wherein m-2 bits of the m-bit label are inherited from the quarter constellation and two further bits of the m input bits are used to distinguish quarters of the two-dimensional symbol constellation; and for each of a plurality of groups of m input bits:
 mapping each group of m input bits to the two-dimensional symbol constellation to form a communication symbol; and
 transmitting the communication symbol.

2. The method of claim 1, wherein of the two further bits of the m-2 bit label used to distinguish quarter-quadrants of the quarter constellation:

a value of [00] corresponds to a first quarter-quadrant of the quarter constellation having the quarter-quadrant constellation;

a value of [01] corresponds to a second quarter-quadrant of the quarter constellation having a quarter-quadrant constellation that has been rotated by −90 degrees;

a value of [11] corresponds to a third quarter-quadrant of the quarter constellation having a quarter-quadrant constellation that has been rotated by 180 degrees; and a value of [10] corresponds to a fourth quarter-quadrant of the quarter constellation having a quarter-quadrant constellation that has been rotated by −270 degrees.

3. The method of claim 1, wherein of the two further bits of the m input bits used to distinguish quadrants of the two-dimensional symbol constellation:

a value of [00] corresponds to a first quadrant of the two-dimensional symbol constellation having the quarter constellation;

a value of [01] corresponds to a second quadrant of the two-dimensional symbol constellation having a quarter constellation that has been rotated by −90 degrees;

a value of [11] corresponds to a third quadrant of the two-dimensional symbol constellation having a quarter constellation that has been rotated by 180 degrees; and a value of [10] corresponds to a fourth quadrant of the two-dimensional symbol constellation having a quarter constellation that has been rotated by −270 degrees.

4. The method of claim 1, wherein:
the two-dimensional symbol constellation is a 256-QAM constellation;
the m input bits comprise eight bits $[y^7, y^6, y^5, y^4, y^3, y^2, y^1, y^0]$;
the $2^{m-4}$ bits are bits $[y^7, y^6, y^4, y^3]$;
the two further bits of the m-2 bit label are bits $[y^5, y^2]$; and
the two further bits of the m input bits are bits $[y^1, y^0]$.

5. The method of claim 1, wherein:
the two-dimensional symbol constellation is a 1024-QAM constellation;
the m input bits comprise ten bits $[y^9, y^8, y^7, y^6, y^5, y^4, y^3, y^2, y^1, y^0]$;
the $2^{m-4}$ bits are bits $[y^9, y^8, y^7, y^5, y^4, y^3]$;
the two further bits of the m-2 bit label are bits $[y^6, y^2]$; and
the two further bits of the m input bits are bits $[y^1, y^0]$.

6. The method of claim 1, wherein forming the quarter constellation further comprises repositioning a plurality of quarter constellation symbol positions.

7. The method of claim 6, wherein:
the two-dimensional symbol constellation is a 128 QAM constellation;
the m input bits comprise seven bits $[y^6, y^5, y^4, y^3, y^2, y^1, y^0]$;
the $2^{m-4}$ bits are bits $[y^6, y^4, y^3]$;
the two further bits of the m-2 bit label are bits $[y^5, y^2]$; and
the two further bits of the m input bits are bits $[y^1, y^0]$.

8. The method of claim 6, wherein:
the two-dimensional symbol constellation is a 512-QAM constellation;
the m input bits comprise eight bits $[y^8, y^7, y^6, y^5, y^4, y^3, y^2, y^1, y^0]$;
the $2^{m-4}$ bits are bits $[y^8, y^7, y^5, y^4, y^3]$;
the two further bits of the m-2 bit label are bits $[y^6, y^2]$; and
the two further bits of the m input bits are bits $[y^1, y^0]$.

9. The method of claim 1, further comprising forming the m input bits from a plurality of information bits by operating upon the plurality of information bits to form a Forward Error Correction (FEC) frame.

10. The method of claim 9, wherein the FEC frame includes an integer number of trellis groups.

11. The method of claim 9, wherein Reed-Solomon encoding is employed to form the FEC frame.

12. The method of claim 1, further comprising forming the m input bits from a plurality of information bits by:
Forward Error Correction (FEC) coding the plurality of information bits to produce a plurality of FEC blocks;
interleaving and randomizing the plurality of FEC blocks; and
appending a frame synch trailer to the plurality of interleaved and randomized FEC blocks to form a FEC frame.

13. The method of claim 9, wherein the FEC frame includes an integer number of trellis groups.

14. A method for forming and transmitting a communication including mapping m input bits to a two-dimensional symbol constellation, where m is a positive integer greater than or equal to four, the method comprising:
forming a quarter-quadrant constellation of $2^{m-4}$ modulation symbols;
forming a quarter constellation of the two-dimensional symbol constellation by adding to the quarter-quadrant constellation three copies of the quarter-quadrant constellation rotated by −90 degrees, 180 degrees, and −270 degrees, respectively, and then displacing the constellation by a shift value Δ such that the symbols coincide with symbols of the two-dimensional symbol constellation, wherein the quarter constellation has one-fourth the size of the two-dimensional symbol constellation;
forming the two-dimensional symbol constellation by adding to the quarter constellation three copies of the quarter constellation rotated by +90 degrees, 180 degrees, and +270 degrees, respectively; and
for each of a plurality of groups of m input bits:
mapping each group of m input bits to the two-dimensional symbol constellation to form a communication symbol; and
transmitting the communication symbol.

15. The method of claim 14, wherein forming the quarter-quadrant constellation further comprises uniquely associating each symbol of the quarter-quadrant constellation with a respective m-4 bit label of the m input bits.

16. The method of claim 14, wherein forming the quarter constellation further comprises uniquely associating each symbol of the quarter constellation with a respective m-2 bit label of the m input bits, wherein m-4 bits of the m-2 bit label are inherited from the symbols of the quarter-quadrant constellation and two further bits of the m-2 bit label are used to distinguish quarter-quadrants of the quarter constellation.

17. The method of claim 16, wherein of the two further bits of the m-2 bit label used to distinguish quarter-quadrants of the quarter constellation:
a value of [00] corresponds to a quarter-quadrant of the quarter constellation having an unrotated quarter-quadrant constellation;
a value of [01] corresponds to a second quarter-quadrant of the quarter constellation having a quarter-quadrant constellation that has been rotated by −90 degrees;
a value of [11] corresponds to a third quarter-quadrant of the quarter constellation having a quarter-quadrant constellation that has been rotated by 180 degrees; and
a value of [10] corresponds to a fourth quarter-quadrant of the quarter constellation having a quarter-quadrant constellation that has been rotated by −270 degrees.

18. The method of claim 14, wherein forming the two-dimensional symbol constellation further comprises uniquely associating each symbol of the two-dimensional symbol constellation with an m-bit label, wherein m-2 bits of the m-bit label are inherited from the quarter constellation and two further bits of the m input bits are used to distinguish quadrants of the two-dimensional symbol constellation.

19. The method of claim 18, wherein of the two further bits of the m input bits used to distinguish quadrants of the two-dimensional symbol constellation:
a value of [00] corresponds to a first quadrant of the two-dimensional symbol constellation having the quarter constellation;

a value of [01] corresponds to a second quadrant of the two-dimensional symbol constellation having a quarter constellation that has been rotated by −90 degrees;

a value of [11] corresponds to a third quadrant of the two-dimensional symbol constellation having a quarter constellation that has been rotated by 180 degrees; and a value of [10] corresponds to a fourth quadrant of the two-dimensional symbol constellation having a quarter constellation that has been rotated by −270 degrees.

20. The method of claim 14, further comprising forming the m input bits from a plurality of information bits by operating upon the plurality of information bits to form a Forward Error Correction (FEC) frame.

21. The method of claim 20, wherein the FEC frame includes an integer number of trellis groups.

22. The method of claim 20, wherein Reed-Solomon encoding is employed to form the FEC frame.

23. The method of claim 14, further comprising forming the m input bits from a plurality of information bits by:

Forward Error Correction (FEC) coding the plurality of information bits to produce a plurality of FEC blocks;

interleaving and randomizing the plurality of FEC blocks; and appending a frame synch trailer to the plurality of interleaved and randomized FEC blocks to form a FEC frame.

24. The method of claim 23, wherein the FEC frame includes an integer number of trellis groups.

25. A transmitter comprising:

Forward Error Correction block that receives a plurality of information bits and that produces a plurality of FEC blocks;

an interleaver that interleaves the plurality of FEC blocks;

a randomizer that randomizes the plurality of FEC blocks;

a frame synch trailer block that appends a frame synch trailer block to the plurality of interleaved and randomized FEC blocks to form an FEC frame having a plurality of input bits; and an encoder that maps m input bits of the plurality of input bits to a two-dimensional symbol constellation that that was constructed by:

forming a quarter-quadrant constellation of $2^{m-4}$ modulation symbols, where m is a positive integer greater than or equal to four;

forming a quarter constellation of the two-dimensional symbol constellation by adding to the quarter-quadrant constellation three copies of the quarter-quadrant constellation rotated by −90 degrees, 180 degrees, and −270 degrees, respectively, and then displacing the constellation by a shift value Δ such that the symbols coincide with symbols of the two-dimensional symbol constellation, wherein the quarter constellation has one-fourth the size of the two-dimensional symbol constellation; and forming the two-dimensional symbol constellation by adding to the quarter constellation three copies of the quarter constellation rotated by +90 degrees, 180 degrees, and +270 degrees, respectively.

26. An apparatus for mapping m input bits to $2^m$ modulation symbols of a two-dimensional symbol constellation, where m is a positive integer greater than or equal to four, the apparatus comprising:

means for forming a quarter-quadrant constellation of $2^{m-4}$ modulation symbols that are located in a first quadrant of the two-dimensional signal plane, the quarter-quadrant constellation having one-sixteenth the size of the two-dimensional symbol constellation;

means for uniquely associating each modulation symbol of the quarter-quadrant constellation with a respective m-4 bit label of the m input bits;

means for forming a quarter constellation of the two-dimensional symbol constellation by adding to the quarter-quadrant constellation three copies of the quarter-quadrant constellation rotated by −90 degrees, 180 degrees, and −270 degrees, respectively, and then displacing the constellation by a shift value Δ such that the symbols coincide with symbols of the two-dimensional symbol constellation, wherein the quarter constellation has one-fourth the size of the two-dimensional symbol constellation;

means for uniquely associating each symbol of the quarter constellation with a respective m-2 bit label of the m input bits, wherein m-4 bits of the m-2 bit label are inherited from the quarter-quadrant constellation and two further bits of the m-2 bit label are used to distinguish quarter-quadrants of the quarter constellation;

means for forming the two-dimensional symbol constellation by adding to the quarter constellation three copies of the quarter constellation rotated by +90 degrees, 180 degrees, and +270 degrees, respectively; and means for uniquely associating each symbol of the two-dimensional symbol constellation with an m-bit label, wherein m-2 bits of the m-bit label are inherited from the quarter constellation and two further bits of the m input bits are used to distinguish quarters of the two-dimensional symbol constellation.

* * * * *